United States Patent
Hanada et al.

(10) Patent No.: US 10,260,681 B2
(45) Date of Patent: Apr. 16, 2019

(54) VALVE DEVICE

(71) Applicant: NISSAN MOTOR CO., LTD., Yokohama-shi, Kanagawa (JP)

(72) Inventors: Tomoyuki Hanada, Kanagawa (JP); Shinichiro Takemoto, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/744,493

(22) PCT Filed: Jul. 15, 2015

(86) PCT No.: PCT/JP2015/070334
§ 371 (c)(1),
(2) Date: Jan. 12, 2018

(87) PCT Pub. No.: WO2017/009992
PCT Pub. Date: Jan. 19, 2017

(65) Prior Publication Data
US 2018/0209588 A1    Jul. 26, 2018

(51) Int. Cl.
*F17C 13/04* (2006.01)
*F16K 31/06* (2006.01)
*F16K 17/38* (2006.01)

(52) U.S. Cl.
CPC .......... *F17C 13/04* (2013.01); *F16K 17/383* (2013.01); *F16K 31/06* (2013.01);
(Continued)

(58) Field of Classification Search
CPC ..... F17C 13/04; F16K 17/383; F16K 31/0655
See application file for complete search history.

(56) References Cited

U.S. PATENT DOCUMENTS 5,452,738 A * 9/1995 Borland ................ F16K 17/383
                                                                137/265
5,813,429 A    9/1998 Ohtaka et al.
(Continued)

FOREIGN PATENT DOCUMENTS

EP    1 855 048 A1    11/2007
JP    10-122495 A    5/1998
(Continued)

OTHER PUBLICATIONS

English machine translation of JP 2005-264966.

*Primary Examiner* — P. Macade Nichols
(74) *Attorney, Agent, or Firm* — Foley & Lardner LLP

(57) ABSTRACT

The problem of the present invention relates to providing a valve device that, even in a case where the valve device is miniaturized, is capable of preventing a gas discharge valve from malfunctioning in response to the heat generated by an electromagnetic actuator.

A valve device 100 includes: an opening and closing valve 130 that is arranged in a gas flow passage 120; and a fusible plug valve 160 that is provided with a valve body 161 operating in response to an increase in temperature of a gas, and discharges the gas to the outside of a high-pressure gas container 20, wherein the valve body of the fusible plug valve is arranged on the upstream side in the gas flow passage than the opening and closing valve on a path through which the gas flows from the supply port 23 of the high-pressure gas container toward the fuel cell 10.

9 Claims, 5 Drawing Sheets

(52) U.S. Cl.
CPC .. *F16K 31/0655* (2013.01); *F17C 2201/0104* (2013.01); *F17C 2201/0109* (2013.01); *F17C 2201/056* (2013.01); *F17C 2203/0604* (2013.01); *F17C 2203/0619* (2013.01); *F17C 2203/0658* (2013.01); *F17C 2203/0663* (2013.01); *F17C 2205/0326* (2013.01); *F17C 2205/0332* (2013.01); *F17C 2205/0338* (2013.01); *F17C 2221/012* (2013.01); *F17C 2223/0123* (2013.01); *F17C 2223/036* (2013.01); *F17C 2260/023* (2013.01); *F17C 2270/0168* (2013.01); *F17C 2270/0184* (2013.01); *Y02E 60/321* (2013.01)

(56) References Cited

U.S. PATENT DOCUMENTS

| | | |
|---|---|---|
| 5,820,102 A | 10/1998 | Borland |
| 2002/0040729 A1 | 4/2002 | Takeda et al. |
| 2003/0041899 A1 | 3/2003 | Frank |
| 2005/0103382 A1 | 5/2005 | Carter |
| 2007/0272891 A1 | 11/2007 | Perthel et al. |
| 2010/0276024 A1 | 11/2010 | Iida et al. |
| 2012/0132298 A1 | 5/2012 | Ishitoya et al. |
| 2013/0277587 A1 | 10/2013 | Zieger et al. |

FOREIGN PATENT DOCUMENTS

| | | |
|---|---|---|
| JP | 2762253 B2 | 6/1998 |
| JP | 2002-115798 A | 4/2002 |
| JP | 2005-264966 A | 9/2005 |
| JP | 2013-230808 A | 11/2013 |

\* cited by examiner

VALVE DEVICE

TECHNICAL FIELD

The present invention relates to a valve device.

BACKGROUND ART

Conventionally, there is known a valve device that controls a gas inflow and a gas outflow of a high-pressure gas container for storing a high-pressure gas. For example, the undermentioned Patent Literature 1 describes a valve device that is mounted to a high-pressure gas container for storing a fuel gas to be supplied to a fuel cell.

The valve device described in the Patent Literature 1 includes a gas flow passage that is communicated with the inside of a high-pressure gas container, and an electromagnetic driven-opening and closing valve that switches between opening and closing of the gas flow passage. When the opening and closing valve is operated, a driving current is supplied to an electromagnetic actuator as work for a driving source, so the operation of moving the opening and closing valve in a valve-opening direction is performed.

Incidentally, a valve device that is mounted to a high-pressure gas container may be provided with a mechanically operated safety valve (gas discharge valve). The mechanically operated safety valve detects the temperature of the gas, when a temperature of a gas stored in the high-pressure gas container increases, and discharges the gas to the outside of the high-pressure gas container. It is also considered that, in the case of the above-described valve device including an electromagnetic driven valve body provided with such a safety valve enables to discharge the gas, the valve device discharges the gas to the outside in the proper timing in response to an increase in temperature of the gas.

Patent Literature 1: Japanese Unexamined Patent Application Publication No. 2005-264966

SUMMARY OF INVENTION

Technical Problem

However, in a case where a safety valve such as that described above is mounted to a valve device that is provided with an electromagnetic driven valve body, the heat generated by a driving current supplied to an electromagnetic actuator is transferred to the safety valve. Therefore, there arises a possibility that the safety valve will malfunction.

In addition, a high-pressure gas container tends to be miniaturized for more compact installation space, and for reduction in manufacturing costs. Similarly, a valve device that is mounted to the high-pressure gas container also requires miniaturization. However, in a case where the valve device is miniaturized, the safety valve is inevitably arranged in proximity to the electromagnetic actuator. Therefore, there exists a problem that the possibility that the safety valve will malfunction in response to the heat generated by the electromagnetic actuator further increases.

Accordingly, an object of the present invention is to provide a valve device that, even in a case where the valve device is miniaturized, is capable of preventing a gas discharge valve from malfunctioning in response to the heat generated by an electromagnetic actuator.

Solution to Problem

According to one aspect of the present invention, a valve device that is mounted to a high-pressure gas container is provided. The valve device includes: a gas flow passage that connects between a supply port of a high-pressure gas container and an object to which a gas is supplied; an opening and closing valve that is arranged in the gas flow passage, and switches between supply of the gas through the gas flow passage and interruption of the supply; an electromagnetic actuator that drives the opening and closing valve; and a gas discharge valve that is provided with a valve body operating in response to an increase in temperature of the gas, and discharges the gas to the outside of the high-pressure gas container. In addition, the valve body of the gas discharge valve is arranged on the upstream side in the gas flow passage than the opening and closing valve on a path through which the gas flows from the supply port toward the object.

According to the above-described aspect, the valve body of the gas discharge valve is arranged in the gas flow passage through which a gas flows when the gas is supplied from the high-pressure gas container to the object. This enables to cause a gas around the valve body of the gas discharge valve to flow. In addition, the valve body of the gas discharge valve is arranged on the upstream side of the gas flow passage than the opening and closing valve, and therefore when the opening and closing valve is operated to supply a gas, a flow of the gas passing around the valve body of the gas discharge valve can be preferably formed. This enables to enhance the sensitivity of the gas discharge valve with respect to a change in temperature of the gas in the high-pressure gas container. Moreover, the valve body of the gas discharge valve is arranged in the gas flow, and a heat-shielding effect produced by the gas flow enables to suppress the heat generated by the electromagnetic actuator from being transferred to the valve body of the gas discharge valve. Therefore, it is possible to provide a valve device that, even in a case where the valve device is miniaturized, is capable of preventing a gas discharge valve from malfunctioning in response to the heat generated by an electromagnetic actuator.

DESCRIPTION OF EMBODIMENTS

Figure 1:
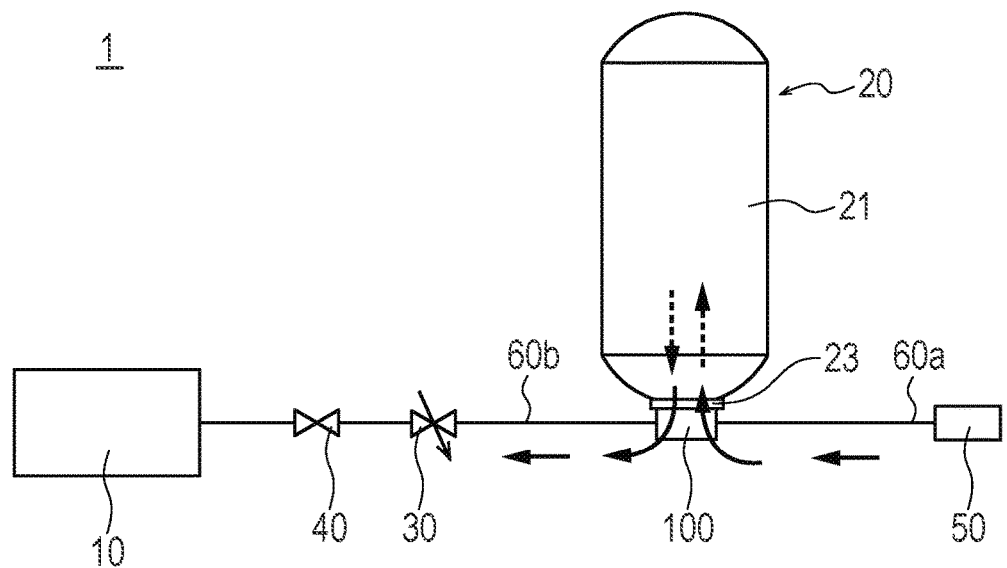
FIG. 1 is a schematic diagram illustrating an example of use of a valve device according to an embodiment of the present invention.

Embodiments of the present invention will be described below with reference to the accompanying drawings. It should be noted that in the explanation of the drawings, identical elements are denoted by identical reference numerals, and overlapping explanation will be omitted. In addition, size ratios in the drawings may be exaggerated for convenience of explanation, and thus may differ from the actual ratios.

<First Embodiment>

FIG. 1 shows an example of use of a valve device 100 according to an embodiment. In this example of use, the valve device 100 is applied to a fuel cell system 1 that is provided in a fuel-cell vehicle.

The valve device 100 is mounted to a high-pressure gas container 20 for storing a fuel gas (for example, a hydrogen gas) to be supplied to a fuel cell (fuel cell stack) 10. The valve device 100 is used as an interception valve that switches between supply of a gas to the inside/outside of the high-pressure gas container 20 and interruption of the supply of the gas.

The high-pressure gas cylinder 20 is connected to a receptacle (fueling port) 50 through the valve device 100 and a first pipe 60a.

The high-pressure gas container 20 is connected to the fuel cell 10 through the valve device 100 and a second pipe 60b. A regulator 30 for regulating a flow rate of the gas to be supplied to the fuel cell 10 and a pressure regulating valve 40 for regulating a pressure of the gas are arranged in the second pipe 60b.

The high-pressure gas container 20 includes: a container body 21 for storing a gas therein; and a supply port 23 that is provided in an end part on the one end side of the container body 21.

The fuel-cell vehicle is equipped with the high-pressure gas container 20 together with, for example, the fuel cell 10.

The container body 21, for example, can be formed of a publicly-known member that has a liner made of synthetic resin provided with a reinforcing layer such as glass fiber or carbon fiber. The supply port 23 of the high-pressure gas container 20 is configured as a mounting base to which the valve device 100 is detachably mounted (refer to FIG. 3). The high-pressure gas container 20, for example, is configured to be capable of storing a high-pressure gas having a maximum pressure of 70 MPa.

The regulator 30, the pressure regulating valve 40 and the undermentioned electromagnetic actuator 140 of the valve device 100 can be subjected to the operation control by, for example, a control unit (controller) provided in the fuel-cell vehicle. The control unit can be configured by a publicly-known microcomputer that is provided with, for example, a CPU, a ROM, a RAM and various kinds of interfaces.

When a gas is supplied into the high-pressure gas container 20, the gas is caused to flow into the first pipe 60a through the receptacle 50 from, for example, an external facility such as a hydrogen station. The gas flows into the valve device 100 via the first pipe 60a. The gas further flows into the high-pressure gas container 20 via the valve device 100.

When the gas is supplied to the fuel cell 10, the gas in the high-pressure gas cylinder 20 is caused to flow into the second pipe 60b through the valve device 100. The gas is supplied to the fuel cell 10 via the second pipe 60b. When the gas goes through the second pipe 60b, the regulator 30 regulates the gas to a desired flow rate and the pressure regulating valve 40 regulate the gas to a desired pressure.

The valve device 100 will be described in detail below with reference to FIGS. 2 to 5 hereafter.

Figure 2:
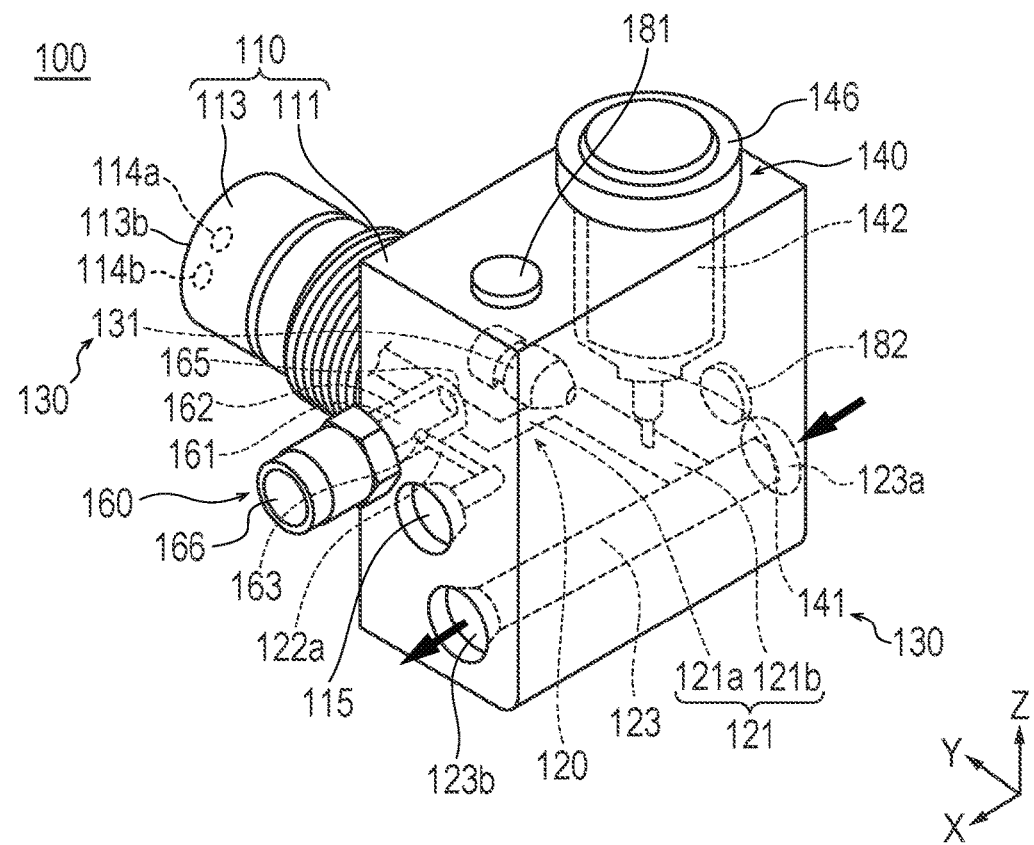
FIG. 2 is a perspective view illustrating a valve device according to a first embodiment of the present invention.
Figure 3:
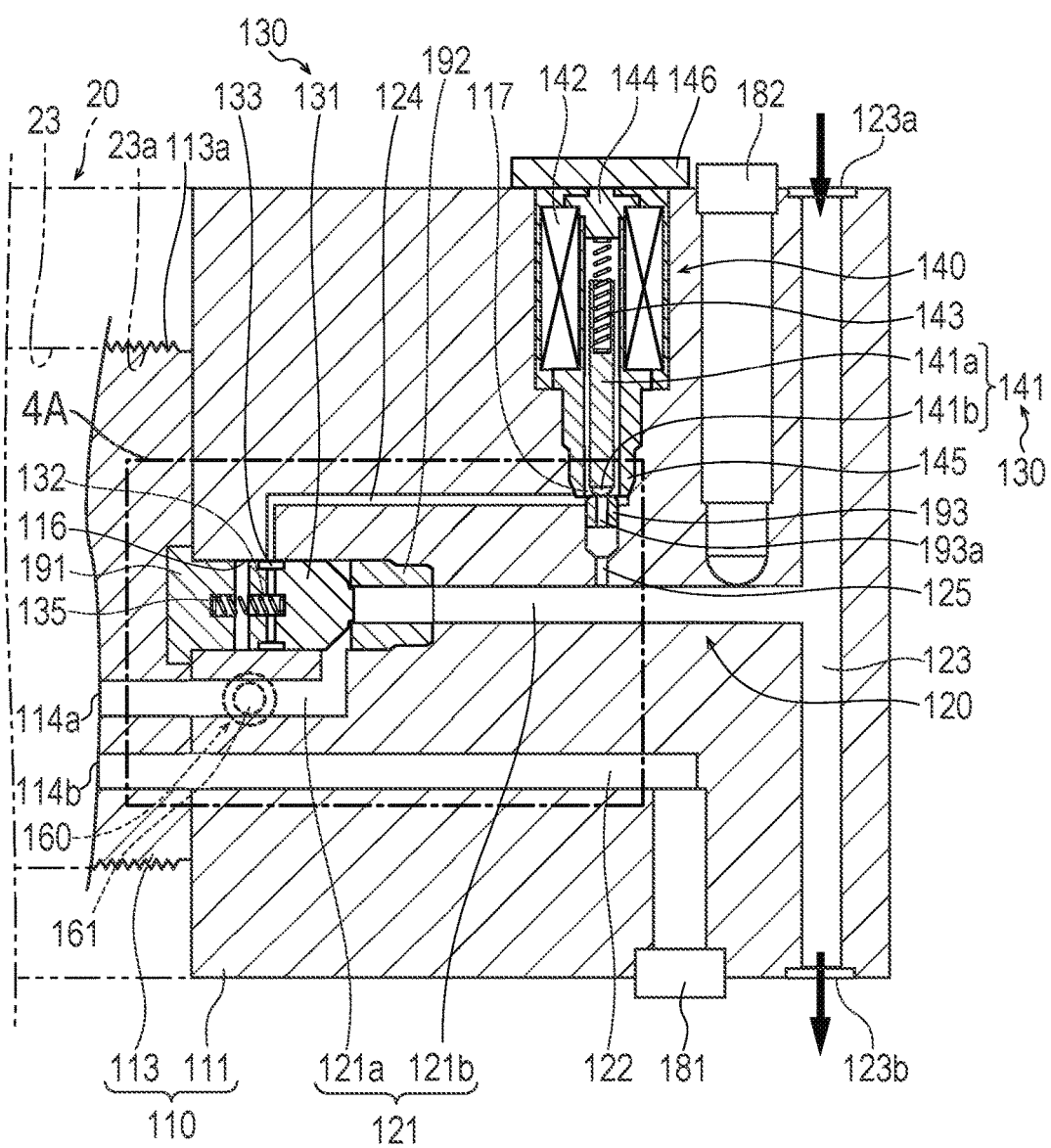
FIG. 3 is a cross-sectional view illustrating a valve device according to the first embodiment of the present invention.
Figure 4:
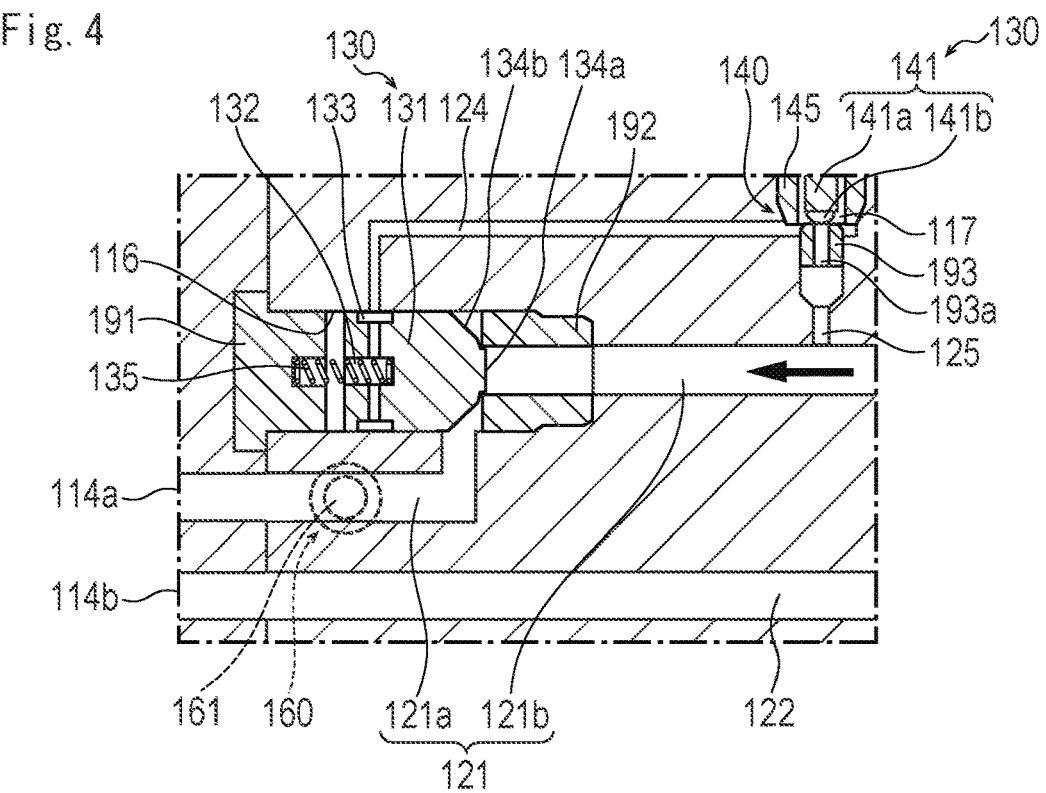
FIG. 4 is a magnified view of a part 4A indicated with a dash-dot line in FIG. 3, and is a diagram illustrating a state in which an opening and closing valve closes a first flow passage.
Figure 5:
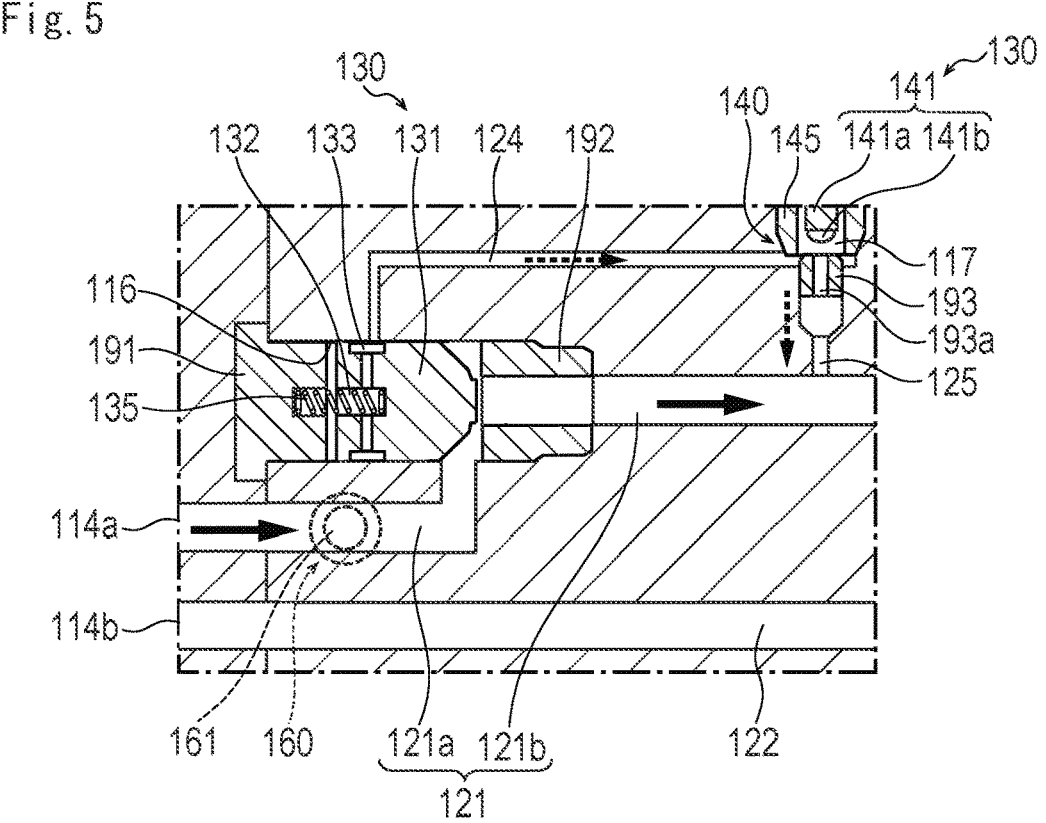
FIG. 5 is a magnified view of the part 4A indicated with the dash-dot line in FIG. 3, and is a diagram illustrating a state in which the opening and closing valve opens the first flow passage.

FIG. 2 is a perspective view illustrating the valve device 100. FIG. 3 is a cross-sectional view schematically illustrating a structure inside the valve device 100. FIGS. 4 and 5 are magnified views of the part 4A indicated with the dash-dot line in FIG. 3, and are diagrams illustrating the operation of the valve device 100. It should be noted that the configuration of the valve device 100 is partially simplified.

The valve device 100, with reference FIG. 2, includes: a gas flow passage 120 that connects the supply port 23 of the high-pressure gas container 20 (refer to FIG. 3) and the fuel cell 10 to which the gas is supplied; an opening and closing valve 130 that is arranged in the gas flow passage 120, and switches between supply of the gas through the gas flow passage 120 and interruption of the supply; the electromagnetic actuator 140 that drives the opening and closing valve 130; and a gas discharge valve 160 that is provided with a valve body 161 operating in response to an increase in temperature of the gas, and discharges the gas to the outside of the high-pressure gas container 20.

As shown in FIG. 2, the valve device 100 is provided with a housing 110 having a gas flow passage 120 formed therein. The housing 110 includes a housing body 111 having a rectangular box shape, and an insertion part 113 having a cylindrical shape protruding from the one end side of the housing body 111. An X-axis shown in FIG. 2 indicates a width direction of the housing body 111, a Y-axis indicates a depth direction of the housing body 111, and a Z-axis indicates a height direction of the housing body 111.

As shown in FIG. 3, the inside of the housing body 111 and the inside of the insertion part 113 are communicated with each other through the gas flow passage 120.

When the valve device 100 is mounted to the high-pressure gas container 20, the insertion part 113 is inserted into the supply port 23. The insertion part 113 has a function as a fixing part that mechanically fixes the valve device 100 to the high-pressure gas container 20. The insertion part 113 is formed with a male screw part 113a that can be screwed to a female screw part 23a formed in an inner surface of the supply port 23 of the high-pressure gas container 20. The high-pressure gas container 20 and the valve device 100 are capable of connecting to each other through the screw part 23a and the screw part 113a.

A material of the housing 110 (the housing body 111, the insertion part 113) is not particularly limited. Metallic materials can be used from the viewpoint of, for example, the processability, the strength and manufacturing costs. In the present embodiment, the housing 110 is formed of aluminum.

As shown in FIG. 3, the gas flow passage 120 formed inside the housing 110 includes: a first inflow opening 114a that is communicated with the supply port 23 of the high-pressure gas container 20; and a first flow passage 121 that is communicated with the first inflow opening 114a. An upstream side further being on an upper position than a position at which the undermentioned main valve 131 is arranged in the first flow passage 121 is referred to as "upstream part 121a" for reasons of convenience. A downstream side further being on a downstream position than the position at which the main valve 131 is arranged in the first flow passage 121 is referred to as "downstream part 121b" for reasons of convenience.

The gas flow passage 120 further includes: a second inflow opening 114b that is communicated with the supply port 23 of the high-pressure gas container 20 at a position different from the position of the first inflow opening 114a; a gas introducing passage 122 that is communicated with the second inflow opening 114b; a communication passage 123 that is communicated with a first connection port 123a to which the first pipe 60a (refer to FIG. 1) is connected, and with a second connection port 123b to which the second pipe 60b (refer to FIG. 1) is connected; and a pilot flow passage 124 that is communicated between the undermentioned valve chamber 116 and the undermentioned pilot chamber 117.

The first flow passage 121 is a flow passage through which a gas to be filled in the high-pressure gas container 20 and a gas to be supplied to the fuel cell 10 are circulated. The communication passage 123 is communicated with the downstream part 121b of the first flow passage 121 in the communication passage 123. When a gas is filled in the high-pressure gas container 20, the gas is caused to flow into the high-pressure gas cylinder 20 via the first pipe 60a, the first connection port 123a, the communication passage 123, the first flow passage 121 and the first inflow opening 114a. Meanwhile, when a gas is supplied to the fuel cell 10, the gas is fed into the fuel cell 10 via the first inflow opening 114a, the first flow passage 121, the communication passage 123, the second connection port 123b and the second pipe 60b. Incidentally, the circulation path of the gas (gas flow) formed when the valve device 100 is operated will be described in detail later.

As shown in FIG. 2, an end surface 113b of the insertion part 113 of the housing 110 is formed with the first inflow opening 114a and the second inflow opening 114b. The first inflow opening 114a and the second inflow opening 114b can each be provided with a filter for preventing contamination or the like existing in the high-pressure gas cylinder 20 from flowing into the valve device 100.

As shown in FIG. 3, the downstream part 121b of the first flow passage 121 is provided with a manual valve 182 for adjusting (throttling) a flow rate of a gas flowing through the first flow passage 121. By manually operating the manual valve 182, the flow rate of the gas circulating through the first flow passage 121 can be adjusted without the operation of opening and closing the opening and closing valve 130.

The gas introducing passage 122 is provided with a manual valve 181 for discharging the gas inside the high-pressure gas container 20 to the outside. By manually operating the manual valve 181, the gas can be discharged to the outside without operating the gas discharge valve 160.

The opening and closing valve 130 is formed of a pilot-operated solenoid valve. The opening and closing valve 130 includes: the main valve 131 to which a biasing force in a valve closing direction that closes the first flow passage 121 is applied; and a pilot valve 141 for moving the main valve 131 in a valve opening direction that opens the first flow passage 121.

The main valve 131 is arranged in the valve chamber 116 that is formed in the body part 111 of the housing 110. The valve chamber 116 is communicated with the first flow passage 121 (refer to FIG. 5).

A biasing member 135 applies a biasing force to the main valve 131 from the back-surface side (the left side in FIG. 3) toward the front surface side (the right side in FIG. 3). The main valve 131 with the biasing force applied is seated on the valve sheet 192 having an end side arranged in the first flow passage 121, and the main valve closes the first flow passage 121. The biasing member 135 can be formed of, for example, a publicly-known elastic member such as a spring.

The biasing member 135 is supported by a support member 191 that is provided on the back-surface side of the main valve 131. The main valve 131 is formed with an internal space 132 inside, the internal space 132 being communicated with the pilot flow passage 124 through a circulation port 133. In a state in which the one end side of the biasing member 135 is fixed to the support member 191, the other end side of the biasing member 135 is inserted into the internal space 132 of the main valve 131, and an end part on the other end side is fixed to the main valve 131.

As shown in FIG. 4, for example, the end surface of the main valve 131 can be formed into a shape that has: a flat part 134a having a shape corresponding to a passage part of the valve sheet 192 so as to improve sealing characteristics when being seated on the valve sheet 192; and a tapered part 134b extending from the flat part 134a.

As shown in FIG. 3, the electromagnetic actuator 140 includes the pilot valve 141; a solenoidal coil (coil part) 142; a spring 143 that applies the biasing force in the valve-closing direction (downward direction in FIG. 3) to the pilot valve 141; a plug 144 constituting a fixed iron core; an actuator case 145 that houses the electromagnetic actuator 140 therein; and a lid part 146 that is arranged outside the housing 110.

The pilot valve 141 is composed of: a plunger 141a that forms a moving core; and a seal part 141b that is arranged at the end of the plunger 141a. The seal part 141b can be formed of a publicly-known material, for example, a resinous elastic member (for example, O ring) or the like.

As shown in FIG. 4, the plunger 141a is arranged in such a manner that an end part of the plunger 141a faces the pilot chamber 117 formed on the front surface side of the plunger 141a. The plunger 141a is arranged so as to be capable of moving forward and backward in a direction (up-and-down direction in FIG. 3) in which the plunger 141a comes close to the valve sheet 193 and goes away from the valve sheet 193 in the actuator case 145.

The biasing force applied from the spring 143 causes the plunger 141a to seat the seal part 141b on the valve sheet 193. In a state in which the seal part 141b is seated on the valve sheet 193, the communication between the pilot flow passage 124 and a relay path 125 formed on the front surface side of the valve sheet 193 is interrupted.

When the pilot valve 141 is opened, a driving current is supplied to the solenoidal coil 142 to electrify the solenoidal coil 142. As a result of the electrification, a magnetic force for attracting the plunger 141a toward the plug 144 side is generated, which causes the plunger 141a, that is to say, the pilot valve 141, to move in a valve opening direction (upward direction in FIG. 3). Consequently, the pilot valve 141 goes away from the valve sheet 193. As shown in FIG. 5, when the pilot valve 141 goes away from the valve sheet 193, the passage part 193a formed in the valve sheet 193 is communicated with the pilot chamber 117. In addition, the valve chamber 116 in which the main valve 131 is arranged is communicated with the downstream part 121b of the first flow passage 121 through the pilot flow passage 124, the pilot chamber 117, the passage part 193a and the relay path 125.

The gas discharge valve 160 is formed of a mechanically operated fusible plug valve (hereinafter referred to as "fusible plug valve 160") that opens by detecting a temperature of a gas in the high-pressure gas container 20.

As shown in FIG. 2, the fusible plug valve 160 includes: a valve body 161 formed of a fusible member; a valve body part 162 that houses the valve body 161, and has a bottom surface formed with an opening 165; a through-hole 163 that is communicated with the inside and outside of the valve body part 162; and a lid part 166 disposed outside the housing 110.

The valve body 161 can be formed of, for example, publicly-known fusible alloy that melts when a predetermined temperature is reached. The valve body part 162 can be formed of, for example, heat-resistant glass. The outer peripheral surface of the valve body part 162 can be formed with, for example, a screw groove or the like that allows mounting to the housing 110.

As shown in FIG. 3, the valve body 161 of the fusible plug valve 160 is arranged on the upstream side in the gas flow passage 120 than the opening and closing valve 130 with respect to a path through which the gas flows from the supply port 23 of the high-pressure gas container 20 toward the fuel cell 10.

The above-described path through which the gas flows is a path ranging from the supply port 23 of the high-pressure gas container 20, and from the first inflow opening 114a of the high-pressure gas container 20, to the second connection port 123b. In addition, further on the upstream side in the gas flow passage 120 than the opening and closing valve 130 is the upstream side of the gas flow viewed from the main valve 131 that opens and closes the first flow passage 121. In the present embodiment, the upstream part 121a of the first flow passage 121 (the flow passage ranging from the first inflow opening 114a to the main valve 131 in the first flow passage 121), which is further on the upstream side than a position at which the main valve 131 is arranged, corresponds to the upstream side in the gas flow passage 120 than the opening and closing valve 130.

As shown in FIG. 2, the opening 165 formed in the valve body part 162 of the fusible plug valve 160 is formed is arranged so as to face the upstream part 121a of the first flow passage 121. The inside of the valve body part 162 is communicated with the upstream part 121a of the first flow passage 121 through the opening 165. Therefore, a bottom part of the valve body 161 housed in the valve body part 162 is arranged so as to face the inside of the upstream part 121a, and thus the bottom part is always exposed to the gas that exists in the upstream part 121a.

As shown in FIG. 2, the through-hole 163 formed in the valve body part 162 of the fusible plug valve 160 is communicated with a gas discharge passage 122a formed in the housing 110. The gas discharge passage 122a is connected to a gas discharge port 115 that is communicated with the outside of the housing 110.

When a temperature of a gas in the high-pressure gas container 20 increases, the heat of the gas is transferred to the valve body 161 of the fusible plug valve 160 through the upstream part 121a of the first flow passage 121. When the valve body 161 is heated to reach a predetermined temperature, the valve body 161 melts. When the valve body 161 melts, the opening 165 formed in the valve body part 162 is brought into an open state. The gas flows into the valve body part 162 from the opening 165 via the upstream part 121a of the first flow passage 121. Further, the gas flows into the gas discharge passage 122a via the through-hole 163 formed in the valve body part 162. Subsequently, the gas is discharged to the outside of the housing 110 through the gas discharge port 115 that is communicated with the gas discharge passage 122a.

The operation of the opening and closing valve 130 (the main valve 131, the pilot valve 141) will be described with reference to FIGS. 4 and 5.

FIG. 4 illustrates a state in which the opening and closing valve 130 closes the first flow passage 121.

When a gas is filled in the high-pressure gas container 20, feeding the gas into the valve device 100 from the receptacle 50 causes the gas to flow into the downstream part 121b of the first flow passage 121 through the communication passage 123 (refer to FIG. 3). In the early stage in which the gas is supplied to the high-pressure gas container 20, a force of the biasing member 135 biases the main valve 131 toward the valve sheet 192 maintains the main valve 131 in a state of being seated on the valve sheet 192. Incidentally, when the gas is filled in the high-pressure gas container 20, the regulator 30 and the pressure regulating valve 40 that are arranged in the second pipe 60b (refer to FIG. 1) are brought into a closed state.

When the gas is continuously supplied, a gas pressure in the downstream part 121b of the first flow passage 121 and a gas pressure in the communication passage 123 gradually increase. In response to the increases in gas pressure, the main valve 131 moves back to the back-surface side against the biasing force of the biasing member 135. When the main valve 131 goes away from the valve sheet 192, a clearance is formed between the valve sheet 192 and the main valve 131. The clearance allows the gas to circulate. The first flow passage 121 in an open state causes the gas to flow into the downstream part 121b of the first flow passage 121. Subsequently, the gas is filled in the high-pressure gas container 20 via the first inflow opening 114a and the supply port 23 of the high-pressure gas container 20.

After filling of the gas in the high-pressure gas container 20 is started, continues supply of the gas gradually increases an internal pressure of the high-pressure gas container 20. When a differential pressure between the internal pressure of the high-pressure gas container 20 and the filling pressure of the gas (the gas pressure in the downstream part 121b of the first flow passage 121 and the gas pressure in the communication passage 123) becomes a little, the biasing force applied by the biasing member 135 moves the main valve 131 in the valve closing direction, and the main valve 131 is seated on the valve sheet 192 again as shown in FIG. 4. The main valve 131 is seated on the valve sheet 192 in a state of being biased by the biasing member 135, and therefore prevents the gas from flowing backward from the high-pressure gas container 20 toward the first flow passage 121 side after filling of the gas ends.

When the gas is supplied to the fuel cell 10, first, the regulator 30 and the pressure regulating valve 40 that are arranged in the second pipe 60b are each brought into an open state. Next, a driving current is supplied to the solenoidal coil 142 of the electromagnetic actuator 140 to open the pilot valve 141 as shown in FIG. 5.

When the pilot valve 141 is opened, the valve chamber 116 in which the main valve 131 is arranged is communicated, through the pilot flow passage 124, with the pilot chamber 117 in which the pilot valve 141 is arranged. Further, the internal space 132 of the main valve 131 is communicated with the pilot flow passage 124 through the circulation port 133. The internal space 132 of the main valve 131 is communicated with the valve chamber 116 on the back-surface side of the main valve 131, and therefore the back pressure of the main valve 131 decreases to a pressure (downstream pressure) in the downstream part 121b of the first flow passage 121 and in the communication passage 123. As a result, the internal pressure of the high-pressure gas container 20 becomes higher than the back pressure of the main valve 131. Subsequently, a differential pressure between the back pressure of the main valve 131 and the internal pressure of the high-pressure gas container 20 generates a force for moving the main valve 131 in the valve opening direction against the biasing force applied to the main valve 131 by the biasing member 135, and consequently the main valve 131 goes away from the valve sheet 192. When the main valve 131 goes away from the valve sheet 192, a clearance is formed between the valve sheet 192 and the main valve 131. The clearance allows the gas to circulate. Consequently, supply of the gas to the fuel cell 10 is started.

The gas flows into the upstream part 121a of the first flow passage 121 from the supply port 23 of the high-pressure gas container 20 via the first inflow opening 114a. Subsequently, the gas flows toward the downstream part 121b of the first flow passage 121 via the periphery of the valve body 161 of the fusible plug valve 160 arranged in the upstream part 121a of the first flow passage 121. In this case, the valve body 161 of the fusible plug valve 160 comes in direct contact with the gas that flows from the high-pressure gas container 20 into the upstream part 121a of the first flow passage 121, and therefore the sensitivity of the valve body 161 with respect to a change in temperature of the gas is enhanced. Moreover, the gas that flows around the valve body 161 of the fusible plug valve 160 has a heat-shielding effect of suppressing the heat generated by the electromagnetic actuator 140 from being transferred to the valve body 161. This enables to prevent the heat from being transferred to the valve body 161 while the driving current is supplied to the solenoidal coil 142 of the electromagnetic actuator 140. In this case, an effect of cooling the valve body 161 by the gas is also produced, and therefore the increase in temperature of the valve body 161 can be more effectively suppressed.

Adding, for example, a cooling circuit or the like for cooling the electromagnetic actuator 140 to the valve device 100 also enables to prevent the heat generated by the electromagnetic actuator 140 from being transferred to the fusible plug valve 160. However, adding such a facility results in upsizing of the valve device 100 correspondingly. In the valve device 100, arranging the valve body 161 of the fusible plug valve 160 further on the upstream side in the gas flow passage 120 than the opening and closing valve 130 enables to prevent the fusible plug valve 160 from malfunctioning, and also enables to attempt the miniaturization of the device.

When supply of the gas to the fuel cell 10 is stopped, the operation of closing the regulator 30, the pressure regulating valve 40 and the pilot valve 141 is performed. As a result of the operation, the biasing force applied by the biasing member 135 moves the main valve 131 in the valve closing direction, and seats the main valve 131 on the valve sheet 192 to close the first flow passage 121.

In the present embodiment, the valve body 161 of the fusible plug valve 160 is arranged in the upstream part 121a of the first flow passage 121. The valve body 161 of the fusible plug valve 160 is located further on the upstream side than the main valve 131. Therefore, irrespective of whether the main valve 131 is in the open or closed state, the valve body 161 of the fusible plug valve 160 is brought into a state of being exposed to the gas that exists in the upstream part 121a of the first flow passage 121. Therefore, even when the temperature of the gas in the high-pressure gas container 20 has increased in a state in which the main valve 131 is closed, the fusible plug valve 160 can be operated, and thus the gas in the high-pressure gas container 20 can be properly discharged to the outside.

As described above, in the present embodiment, the opening and closing valve 130 is arranged in the gas flow passage 120 provided with the valve device 100. In addition, on the path through which the gas flows from the supply port 23 of the high-pressure gas container 20 toward the fuel cell 10, the valve body 161 of the fusible plug valve 160 is arranged on the upstream side in the gas flow passage 120 than the opening and closing valve 130.

This enables to cause the gas around the valve body 161 of the fusible plug valve 160 to flow while the gas is supplied from the high-pressure gas container 20 to the fuel cell 10. In addition, the valve body 161 is arranged on the upstream side of the gas flow passage 120 than the opening and closing valve 130, and therefore when the opening and closing valve 130 is operated to supply the gas, a flow of the gas passing around the valve body 161 of the fusible plug valve 160 can be preferably formed. This enables to enhance the sensitivity of the fusible plug valve 160 with respect to a change in temperature of the gas in the high-pressure gas container 20. Moreover, the valve body 161 of the fusible plug valve 160 is arranged in the gas flow, and therefore a heat-shielding effect produced by the gas flow enables to suppress the heat generated by the electromagnetic actuator 140 from being transferred to the fusible plug valve 160. Therefore, it is possible to provide the valve device 100 that, even in a case where the valve device 100 is miniaturized, is capable of preventing the fusible plug valve 160 from malfunctioning in response to the heat generated by the electromagnetic actuator 140.

In the present embodiment, the opening and closing valve 130 includes: the main valve 131 that is arranged in the first flow passage 121 of the gas flow passage 120; and the pilot valve 141 for moving the main valve 131 in the valve opening direction that opens the first flow passage 121. Further, the valve body 161 of the fusible plug valve 160 is arranged on the upstream side in the gas flow passage 120 than the main valve 131.

Therefore, when the main valve 131 moves in the valve opening direction to open the first flow passage 121, with the result that the gas is supplied to the fuel cell 10 via the supply port 23 of the high-pressure gas container 20, the first inflow opening 114a and the first flow passage 121, the gas flows toward the downstream side via the periphery of the fusible plug valve 160 located on the upstream side of the main valve 131. Therefore, a flow of the gas passing around the valve body 161 of the fusible plug valve 160 can be preferably formed in response to the operation of the main valve 131. Moreover, while the main valve 131 opens to supply the gas, the gas flowing around the valve body 161 of the fusible plug valve 160 shields the heat of the valve body 161. Therefore, the valve device 100 enables to effectively suppress the heat generated by the electromagnetic actuator 140 from being transferred to the valve body 161 of the fusible plug valve 160.

In addition, in the present embodiment, the valve body 161 of the fusible plug valve 160 is arranged in the upstream part 121a of the first flow passage 121 ranging from the first inflow opening 114a to the upstream side of the main valve 131. In other words, the valve body 161 of the fusible plug valve 160 is configured to be arranged in the first flow passage 121 through which the gas inevitably circulates when the gas is supplied from the high-pressure gas container 20 to the fuel cell 10. The configuration made in this manner enables to arrange the valve body 161 of the fusible plug valve 160 in the path of the gas flow without additionally providing a flow passage, and therefore enables to provide the valve device 100 having a simple and easy structure.

Furthermore, in the present embodiment, the gas discharge valve is configured by the fusible plug valve 160, the valve body 161 of which is formed of a fusible member. Therefore, the valve body 161 can be operated in response to an increase in temperature of the gas in the high-pressure gas container 20. The valve device 100 enables to quickly discharge the gas to the outside of the high-pressure gas container 20.

<Second Embodiment>

A valve device 200 according to a second embodiment of the present invention will be described. In the description of the present embodiment, features including a configuration, which are not particularly explained, are the same as those of the valve device 100 according to the first embodiment described above. In addition, members having the same functions are denoted by the same reference numerals of the members respectively, and the description thereof will be omitted.

Figure 6:
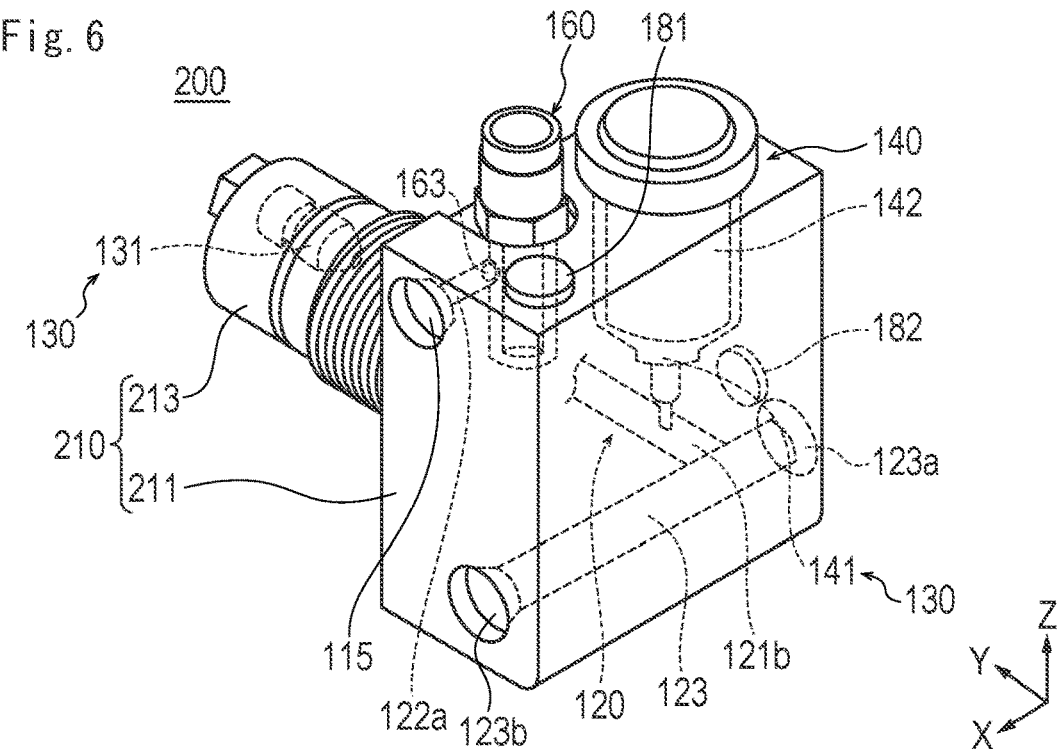
FIG. 6 is a perspective view illustrating a valve device according to a second embodiment of the present invention.
Figure 7:
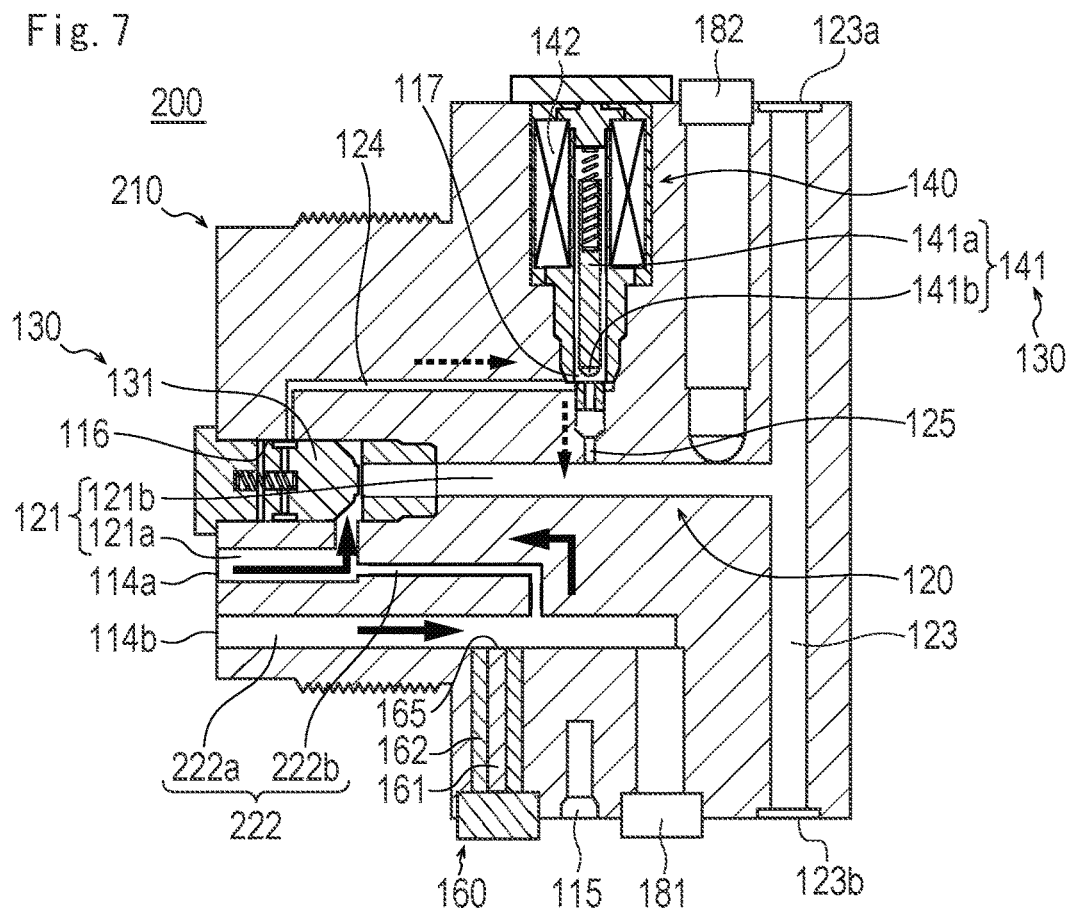
FIG. 7 is a cross-sectional view illustrating the valve device according to the second embodiment of the present invention.

FIGS. 6 and 7 are diagrams each illustrating the valve device 200 according to the second embodiment. FIG. 6 is a perspective view illustrating the valve device 200. FIG. 7 is a cross-sectional view schematically illustrating a structure inside the valve device 200.

In the valve device 200 according to the second embodiment, as with the valve device 100 according to the first embodiment, the valve body 161 of the fusible plug valve 160 is arranged on the upstream side in the gas flow passage 120 than the main valve 131 provided in the opening and closing valve 130. However, in the valve device 100 according to the first embodiment, the valve body 161 of the fusible plug valve 160 is arranged in the upstream part 121a of the first flow passage 121 (the flow passage ranging from the first inflow opening 114a to the main valve 131). Meanwhile, in the valve device 200 according to the second embodiment, the valve body 161 of the fusible plug valve 160 is arranged in the first sub flow passage 222. The first sub flow passage 222 is provided so as to be communicated with the upstream part 121a of the first flow passage 121.

As shown in FIGS. 6 and 7, the housing 210 is composed of a housing body 211 and an insertion part 213. The main valve 131 is mounted inside the insertion part 213.

The first sub flow passage 222 is communicated with the supply port 23 (illustration is omitted) of the high-pressure gas container 20 through the second inflow opening 114b that is formed at a position different from the position of the first inflow opening 114a. The first sub flow passage 222 includes: an upstream part 222a in which the valve body 161 of the fusible plug valve 160 is arranged; and a downstream part 222b that is communicated between the upstream part 222a and the upstream part 121a of the first flow passage 121.

The opening 165 formed with the valve body 162 of the fusible plug valve 160 is arranged so as to face the upstream part 222a of the first sub flow passage 222. The inside of the valve body 162 is communicated with the upstream part 222a of the first sub flow passage 222 through the opening 165. Therefore, a bottom part of the valve body 161 housed in the valve body part 162 is arranged so as to face the inside of the upstream part 222a. The bottom part of the valve body 161 is always exposed to the gas that exists in the upstream part 222a.

The manual valve 181 for discharging the gas inside the high-pressure gas container 20 to the outside is arranged in the upstream part 222a of the first sub flow passage 222.

As shown in FIG. 7, when the gas is supplied to the fuel cell 10, the opening and closing valve 130 (the main valve 131, the pilot valve 141) is opened. The gas inside the high-pressure gas container 20 flows into the upstream part 121a of the first flow passage 121 through the first inflow opening 114a, and flows into the upstream part 222a of the first sub flow passage 222 through the second inflow opening 114b. The gas that has flowed into the upstream part 222a of the first sub flow passage 222 passes around the valve body 161 of the fusible plug valve 160, and then flows into the upstream part 121a of the first flow passage 121. By operating the opening and closing valve 130 to start the supply of the gas to the fuel cell 10 in this manner, a gas flow can be preferably formed around the valve body 161 of the fusible plug valve 160 that is arranged in the upstream part 222a of the first sub flow passage 222.

As described above, in the present embodiment, the opening and closing valve 130 is arranged in the gas flow passage 120 provided in the valve device 100. In addition, the valve body 161 of the fusible plug valve 160 is arranged on the upstream side in the gas flow passage 120 than the opening and closing valve 130. More specifically, the first sub flow passage 222 that is communicated with the upstream part 121a of the first flow passage 121 is additionally provided, and the valve body 161 of the fusible plug valve 160 is arranged in the first sub flow passage 222.

Therefore, as with the valve device 100 according to the first embodiment described above, the valve device 200 enables to enhance the sensitivity of the valve body 161 with respect to a change in temperature of the gas in the high-pressure gas container 20, and enables to suppress the heat generated by the electromagnetic actuator 140 from being transferred to the valve body 161. Moreover, it is possible to prevent restrictions from being imposed on a mounting position of the fusible plug valve 160 under the influence of a layout of the first flow passage 121. Therefore the design flexibility of the valve device 200 can be increased.

It should be noted that a position at which the valve body 161 of the fusible plug valve 160 is arranged is not particularly limited so long as the position that is in the first sub flow passage 222. The valve body 161 may be arranged at a position illustrated as the downstream part 222b. In this case as well, the fusible plug valve 160 can be preferably prevented from malfunctioning in response to the heat generated by the electromagnetic actuator 140.

<Third Embodiment>

A valve device 300 according to a third embodiment of the present invention will be described. In the description of the present embodiment, features including a configuration, which are not particularly explained, are the same as those of each of the valve devices 100 and 200 according to the first and second embodiments described above respectively. In addition, members having the same functions are denoted by the same reference numerals of the members respectively, and the description thereof will be omitted.

Figure 8:
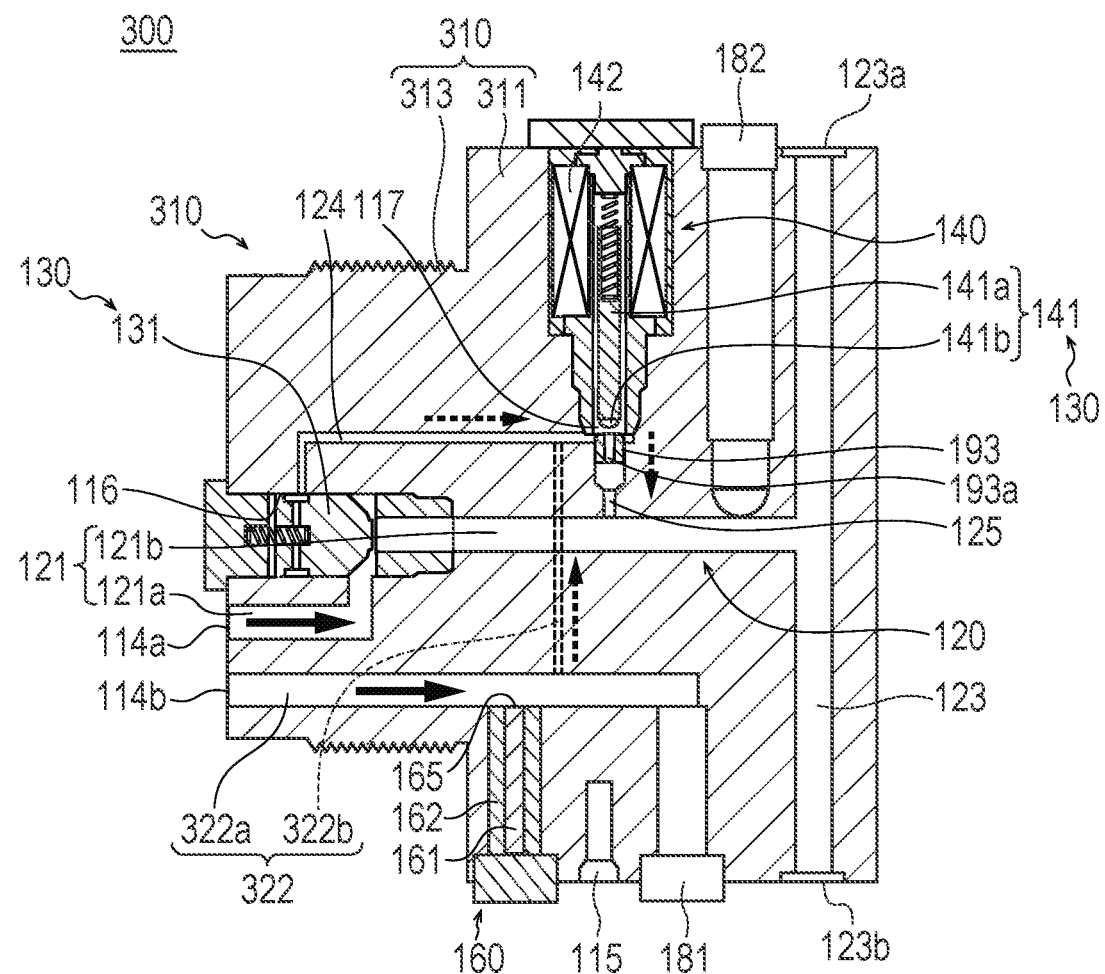
FIG. 8 is a cross-sectional view illustrating the valve device according to a third embodiment of the present invention.

FIG. 8 is a cross-sectional view schematically illustrating a structure inside the valve device 300.

In the valve device 300 according to the third embodiment, as with the valve devices 100 and 200 according to the first and second embodiments described above respectively, the valve body 161 of the fusible plug valve 160 is arranged on the upstream side in the gas flow passage 120 than the opening and closing valve 130. However, in the valve devices 100 and 200 according to the first and second embodiments described above respectively, the valve body 161 of the fusible plug valve 160 is arranged on the upstream side in the gas flow passage 120 than the main valve 131 with reference to the main valve 131 provided in the opening and closing valve 130. Meanwhile, in the valve device 300 according to the third embodiment, the valve body 161 of the fusible plug valve 160 is arranged on the upstream side in the gas flow passage 120 than the pilot valve 141 with reference to the pilot valve 141 provided in the opening and closing valve 130.

As shown in FIG. 8, a housing 310 is composed of a housing body 311 and an insertion part 313. The main valve 131 is mounted inside the insertion part 313.

The gas flow passage 120 includes a second sub flow passage 322. The second sub flow passage 322 is configured as a flow passage that connects the second inflow opening 114b formed at a position different from the position of the first inflow opening 114a to the pilot flow passage 124 on the upstream side than the pilot chamber 117.

The second sub flow passage 322 includes an upstream part 322a in which the valve body 161 of the fusible plug valve 160 is arranged; and a downstream part 322b that is communicated between the upstream part 322a and the pilot flow passage 124.

A flow passage diameter of a part of the second sub flow passage 322 is configured to be smaller than or equal to a flow passage diameter of the pilot flow passage 124. The part of the second sub flow passage 322 (a flow passage diameter of the downstream part 322b) is on the downstream side than the position at which the valve body 161 of the fusible plug valve 160 is arranged. By configuring the flow passage diameter of the downstream part 322b to be such a size, a flow rate of the gas flowing into the pilot flow passage 124 from the downstream part 322b can be small.

The opening 165 formed with the valve body part 162 of the fusible plug valve 160 is arranged so as to face the upstream part 322a of the second sub flow passage 322. The inside of the valve body part 162 is communicated with the upstream part 322a of the second sub flow passage 322 through the opening 165. Therefore, a bottom part of the valve body 161 housed in the valve body part 162 is arranged so as to face the inside of the upstream part 322a. The bottom part of the valve body 161 is always exposed to the gas that exists in the upstream part 322a. Incidentally, the inside of the valve body part 162 is communicated with the gas discharge port 115 through the gas discharge passage 122a (illustration is omitted).

As shown in FIG. 8, when the gas is supplied to the fuel cell 10, the opening and closing valve 130 (the main valve 131, the pilot valve 141) is opened. The gas inside the high-pressure gas container 20 flows into the upstream part 121a of the first flow passage 121 through the first inflow opening 114a, and flows into the upstream part 322a of the second sub flow passage 322 through the second inflow opening 114b. The gas that has flowed into the upstream part 322a of the second sub flow passage 322 passes around the valve body 161 of the fusible plug valve 160, and then flows into the downstream part 322b of the second sub flow passage 322. By operating the opening and closing valve 130 to start the supply of the gas to the fuel cell 10 in this manner, a gas flow can be preferably formed around the valve body 161 of the fusible plug valve 160 that is arranged in the upstream part 322a of the second sub flow passage 322.

The gas that has flowed into the downstream part 322b of the second sub flow passage 322 flows into the downstream part 121b of the first flow passage 121 via the pilot flow passage 124, the pilot chamber 117, the passage part 193a of the valve sheet 193, and the relay path 125.

A flow passage diameter of the downstream part 322b of the second sub flow passage 322 is configured to be smaller than a flow passage diameter of the pilot flow passage 124. Therefore, the flow rate of the gas flowing into the downstream part 121b of the first flow passage 121 via the pilot flow passage 124 and the pilot chamber 117 is suppressed to be small in comparison with the flow rate of the gas flowing into the downstream part 121b of the first flow passage 121 via the main valve 131 side.

As described above, in the present embodiment, the opening and closing valve 130 is arranged in the gas flow passage 120 provided in the valve device 100. In addition, the valve body 161 of the fusible plug valve 160 is arranged on the upstream side in the gas flow passage 120 than the pilot valve 141 provided in the opening and closing valve 130. More specifically, the valve body 161 of the fusible plug valve 160 is arranged in the second sub flow passage 322 that connects the second inflow opening 114b to the pilot flow passage 124 further on the upstream side than the pilot chamber 117.

As a result, when the pilot valve 141 operates to cause a gas to flow through the supply port 23 of the high-pressure gas container 20, the second inflow opening 114b, the second sub flow passage 322, and the pilot chamber 117, the gas flows toward the downstream side, and flows passing around the valve body 161 of the fusible plug valve 160 located on the upstream of the pilot valve 141. Therefore, a flow of the gas passing around the valve body 161 of the fusible plug valve 160 can be preferably formed in response to the operation of the pilot valve 141. Moreover, while the opening and closing valve 130 opens to supply the gas, the gas flowing around the valve body 161 of the fusible plug valve 160 shields the heat of the valve body 161. The gas flowing enables to effectively suppress the heat generated by the electromagnetic actuator 140 from being transferred to the valve body 161 of the fusible plug valve 160. In addition, the second sub flow passage 322 that connects the second inflow opening 114b and the pilot flow passage 124 is additionally provided, and the valve body 161 of the fusible plug valve 160 is arranged in the second sub flow passage 322. Therefore, it is possible to prevent restrictions from being imposed on a mounting position of the fusible plug valve 160. Therefore, the design flexibility of the valve device 300 can be increased.

In addition, in the present embodiment, the flow passage diameter of the downstream part 322b of the second sub flow passage 322 is configured to be smaller than or equal to a flow passage diameter of the pilot flow passage 124. Therefore, a flow rate of the gas flowing into the first flow passage 121 via the pilot flow passage 124 and the pilot chamber 117 is suppressed to be small in comparison with the flow rate of the gas flowing into the downstream part 121b of the first flow passage 121 via the main valve 131 side.

This enables to preferably prevent the durability of the pilot valve 141 (for example, the durability of the seal part 141b) from decreasing, and to preferably prevent a valve function from being impaired, as a result of additionally providing the second sub flow passage 322 that is connected to the pilot flow passage 124.

It should be noted that a position at which the valve body 161 of the fusible plug valve 160 is arranged is not particularly limited so long as the position that is in the second sub flow passage 322. The valve body 161 may be arranged at a position illustrated as the downstream part 322b. In this case as well, the fusible plug valve 160 can be preferably prevented from malfunctioning in response to the heat generated by the electromagnetic actuator 140.

The valve device according to the present invention has been described in accordance with the embodiments described above. However, the present invention is not limited to the embodiments described herein, and can be modified as appropriate on the basis of the description of claims.

For example, the gas discharge valve is not limited to the fusible plug valve. Any valve may be used as the gas discharge valve so long as the valve to be used is a mechanically operated valve that opens by detecting a temperature of a gas in a high-pressure gas container. For example, a thermosensitive valve provided with a valve body that reversibly opens and closes in response to a temperature of a gas can be used as the gas discharge valve. In addition, in the description of the embodiments, the valve described as the gas discharge valve has a configuration in which the gas is discharged to the outside through the flow passage (gas discharge passage) formed in the housing and the port (gas discharge port) formed in the housing. However, the gas discharge valve may be configured to cause a gas to pass through the inside of the gas discharge valve without passing through the flow passage and the port, and to cause the gas to be directly discharged to the outside.

Moreover, for example, the valve device may be mounted to a high-pressure gas container other than the high-pressure gas container for storing a fuel gas that is supplied to an in-vehicle fuel cell. For example, the valve device may be mounted to a high-pressure gas container for storing a natural gas.

In addition, for example, the opening and closing valve is not particularly limited so long as the opening and closing valve is driven by an electromagnetic actuator. The opening and closing valve may be a direct acting solenoid valve or a kick pilot solenoid valve.

Moreover, in the description of the embodiments, the valve described as the opening and closing valve has a configuration in which while a driving current is supplied to the electromagnetic actuator, the gas flow passage is opened to supply the gas, and while supply of the driving current to the electromagnetic actuator is stopped, the gas flow passage is closed to stop the supply of the gas. However, the opening and closing valve may be configured to operate in such a manner that while a driving current is supplied to the electromagnetic actuator, the gas flow passage is closed to stop the supply of the gas, and while supply of the driving current to the electromagnetic actuator is stopped, the gas flow passage is opened to supply the gas.

Further, the valve body of the gas discharge valve is not particularly limited so long as the valve body of the gas discharge valve is arranged in the gas flow passage, and is arranged further on the upstream side in the path through which the gas flows than the opening and closing valve that switches the supply and interruption of the gas. For example, as shown in the embodiment, in a case where the opening and closing valve is formed of a pilot-operated valve that is provided with a main valve and a pilot valve, a gas discharge valve has only to be arranged at a position that is on the upstream side with respect to any one of the main valve and the pilot valve. In addition, in a case where the opening and closing valve is formed of a valve other than the pilot-operated valve (for example, in the case of a direct acting valve), a position at which the gas discharge valve is arranged is not particularly limited so long as the position is further on the upstream side than the opening and closing valve.

Furthermore, configurations of parts of the valve device, layouts of flow passages and the like are not limited to those illustrated in the figures. For example, the omission of the use of additional members shown in the embodiments, and the use of other additional members that have not been shown in the embodiments, may be performed as appropriate.

REFERENCE SIGNS LIST

10 Fuel cell (object)
20 High-pressure gas container
23 Gas supply port
100 Valve device
114a First inflow opening
114b Second inflow opening
116 Valve chamber
117 Pilot chamber
120 Gas flow passage
121 The first flow passage
121a Upstream part of first flow passage
121b Downstream part of first flow passage
124 Pilot flow passage
130 Opening and closing valve
131 Main valve
140 Electromagnetic actuator
141 Pilot valve
141a Plunger
160 Fusible plug valve (gas discharge valve)
161 Valve body (fusible member)
200 Valve device
222 First sub flow passage
222a Upstream part of first sub flow passage
222b Downstream part of first sub flow passage
300 Valve device
322 Second sub flow passage
322a Upstream part of second sub flow passage
322b Downstream part of second sub flow passage

The invention claimed is:

1. A valve device that is mounted to a high-pressure gas container, the valve device comprising:
   a housing;
   a gas flow passage provided in the housing, and configured to connect a supply port of the high-pressure gas container and an object to which a gas is supplied;
   an opening and closing valve arranged in the gas flow passage, and configured to switch between supply of the gas through the gas flow passage and interruption of the supply;
   an electromagnetic actuator configured to drive the opening and closing valve; and
   a gas discharge valve arranged in a path in communication with the gas flow passage in the housing, the gas discharge valve comprising a valve body configured to operate in response to an increase in temperature of the gas, and to discharge the gas to an outside of the high-pressure gas container,
   wherein the valve body of the gas discharge valve is arranged more upstream than the opening and closing valve in a gas flow passage of the path through which the gas flows from the supply port toward the object.

2. The valve device according to claim 1, wherein the gas discharge valve comprises a fusible plug valve, and the valve body is formed of a fusible member.

3. A valve device that is mounted to a high-pressure gas container, the valve device comprising:
   a gas flow passage configured to connect a supply port of the high-pressure gas container and an object to which a gas is supplied;
   an opening and closing valve arranged in the gas flow passage, and configured to switch between supply of the gas through the gas flow passage and interruption of the supply;
   an electromagnetic actuator configured to drive the opening and closing valve; and a gas discharge valve arranged in a gas flow passage in communication with the gas flow passage in which the opening and closing valve is arranged, the gas discharge valve comprising a valve body configured to operate in response to an increase in temperature of the gas, and to discharge the gas to an outside of the high-pressure gas container, wherein:

the gas flow passage in which the gas discharge valve is arranged comprises
- a first inflow opening in communication with the supply port, and
- a first flow passage in communication with the first inflow opening;

the valve body of the gas discharge valve is arranged in the first flow passage more upstream than the opening and closing valve in a gas flow passage of a path through which the gas flows from the supply port toward the object;

the opening and closing valve includes
- a main valve to which a biasing force in a valve closing direction that closes the first flow passage is configured to be applied, and
- a pilot valve configured to generate a force against the biasing force in response to an operation of a plunger provided in the electromagnetic actuator, and to move the main valve in a valve opening direction that opens the first flow passage, the valve body of the gas discharge valve is arranged more upstream than the main valve in the gas flow passage.

4. The valve device according to claim 3, wherein:
the valve body of the gas discharge valve is arranged in the first flow passage between the first inflow opening and an upstream side of the main valve.

5. The valve device according to claim 3, wherein:
the gas flow passage comprises
- a second inflow opening in communication with the supply port at a position different from a position of the first inflow opening, and
- a first sub flow passage configured to connect the second inflow opening and the first flow passage more upstream than the main valve; and the valve body of the gas discharge valve is arranged in the first sub flow passage.

6. The valve device according to claim 3, wherein
the gas discharge valve comprises a fusible plug valve, and the valve body is formed of a fusible member.

7. A valve device that is mounted to a high-pressure gas container, the valve device comprising:
a gas flow passage configured to connect a supply port of the high-pressure gas container and an object to which a gas is supplied;

an opening and closing valve arranged in the gas flow passage, and configured to switch between supply of the gas through the gas flow passage and interruption of the supply;

an electromagnetic actuator configured to drive the opening and closing valve; and a gas discharge valve arranged in a gas flow passage in communication with the gas flow passage in which the opening and closing valve is arranged, and provided with a valve body configured to operate in response to an increase in temperature of the gas, and to discharge the gas to an outside of the high-pressure gas container, wherein:

the valve body of the gas discharge valve is arranged more upstream than the opening and closing valve in a gas flow passage of a path through which the gas flows from the supply port toward the object;

the gas flow passage includes
- a first inflow opening in communication with the supply port, and
- a first flow passage in communication with the first inflow opening;

the opening and closing valve includes
- a main valve to which a biasing force in a valve closing direction that closes the first flow passage is configured to be applied, and
- a pilot valve configured to generate a force against the biasing force in response to an operation of a plunger provided in the electromagnetic actuator, and to move the main valve in a valve opening direction that opens the first flow passage;

the gas flow passage further includes
- a second inflow opening in communication with the supply port at a position different from a position of the first inflow opening,
- a pilot flow passage configured to connect a pilot chamber in communication with the first flow passage, and in which the pilot valve is arranged, and a valve chamber in which the main valve is arranged, and
- a sub flow passage configured to connect the inflow opening and the pilot flow passage upstream of the pilot chamber; and the valve body of the gas discharge valve is arranged in the sub flow passage.

8. The valve device according to claim 7, wherein
a flow passage diameter of the sub flow passage is smaller than or equal to a flow passage diameter of the pilot flow passage, the sub flow passage being arranged more downstream than the valve body.

9. The valve device according to claim 7, wherein
the gas discharge valve comprises a fusible plug valve, and the valve body is formed of a fusible member.

* * * * *